(12) United States Patent
Thaler et al.

(10) Patent No.: US 7,071,271 B2
(45) Date of Patent: Jul. 4, 2006

(54) AQUEOUS EMULSION POLYMERIZATION OF FUNCTIONALIZED FLUOROMONOMERS

(75) Inventors: Arne Thaler, Altoetting (DE); Klaus Hintzer, Kastl (DE); Kai H. Lochhaas, Neuoetting (DE); Franz Maerz, Burgkirchen (DE); Steven J. Hamrock, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/697,768

(22) Filed: Oct. 30, 2003

(65) Prior Publication Data

US 2005/0096442 A1    May 5, 2005

(51) Int. Cl.
*C08F 114/18* (2006.01)

(52) U.S. Cl. ............ 526/243; 524/805; 524/795; 526/242; 526/255

(58) Field of Classification Search ............ 526/243, 526/242, 255; 524/805, 795
See application file for complete search history.

(56) References Cited

U.S. PATENT DOCUMENTS

| | | | |
|---|---|---|---|
| 3,282,875 A * | 11/1966 | Connolly et al. ............ 524/795 |
| 3,635,926 A | 1/1972 | Gresham et al. |
| 3,784,399 A | 1/1974 | Grol |
| 3,853,828 A | 12/1974 | Wall et al. |
| 4,000,356 A | 12/1976 | Weisgerber et al. |
| 4,073,752 A | 2/1978 | Ramp |
| 4,169,023 A | 9/1979 | Sata et al. |
| 4,214,060 A | 7/1980 | Apotheker et al. |
| 4,218,542 A | 8/1980 | Ukihashi et al. |
| 4,230,549 A | 10/1980 | D'Agostino et al. |
| 4,242,498 A | 12/1980 | Frosch et al. |
| 4,268,650 A | 5/1981 | Rose |
| 4,281,092 A | 7/1981 | Breazeale |
| 4,330,654 A | 5/1982 | Ezzell et al. |
| 4,334,082 A | 6/1982 | Resnick |
| 4,391,844 A | 7/1983 | Baczek et al. |
| 4,414,159 A | 11/1983 | Resnick |
| 4,440,917 A | 4/1984 | Resnick |
| 4,454,247 A | 6/1984 | Resnick |
| 4,470,889 A | 9/1984 | Ezzell et al. |
| 4,508,603 A | 4/1985 | Ukihashi et al. |
| 4,602,045 A | 7/1986 | Markus et al. |
| 4,686,024 A | 8/1987 | Scherer, Jr. et al. |
| 4,734,474 A * | 3/1988 | Hamada et al. ............ 526/243 |
| 4,743,419 A | 5/1988 | Bierschenk |
| 4,755,567 A | 7/1988 | Bierschenk et al. |
| 4,981,932 A | 1/1991 | Blaise et al. |
| 5,260,351 A | 11/1993 | Logothetis |
| 5,264,508 A | 11/1993 | Ishibe et al. |
| 5,330,626 A | 7/1994 | Banerjee |
| 5,466,930 A | 11/1995 | Schlenoff |
| 5,527,861 A | 6/1996 | Logothetis |
| 5,608,022 A | 3/1997 | Nakayama et al. |
| 5,693,748 A | 12/1997 | Ikeda et al. |
| 5,795,496 A | 8/1998 | Yen et al. |
| 5,798,417 A | 8/1998 | Howard, Jr. |
| 5,804,650 A | 9/1998 | Tsuda et al. |
| 5,852,148 A * | 12/1998 | Behr et al. ................. 526/245 |
| 5,986,012 A | 11/1999 | Legare et al. |
| 6,011,074 A | 1/2000 | Sorenson et al. |
| 6,090,895 A | 7/2000 | Mao et al. |
| 6,224,994 B1 | 5/2001 | Asukabe et al. |
| 6,225,368 B1 | 5/2001 | D'Agostino et al. |
| 6,242,123 B1 | 6/2001 | Nezu et al. |
| 6,248,469 B1 | 6/2001 | Formato et al. |
| 6,254,978 B1 | 7/2001 | Bahar et al. |
| 6,255,370 B1 | 7/2001 | Vizcaino et al. |
| RE37,307 E | 8/2001 | Bahar et al. |
| 6,274,677 B1 * | 8/2001 | Tatemoto ................. 525/276 |
| 6,277,512 B1 | 8/2001 | Hamrock et al. |
| 6,355,370 B1 | 3/2002 | Katoh et al. |
| RE37,656 E | 4/2002 | Bahar et al. |
| 6,365,769 B1 * | 4/2002 | Behr et al. ................. 560/147 |

(Continued)

FOREIGN PATENT DOCUMENTS

DE    26 24 203    12/1976

(Continued)

OTHER PUBLICATIONS

U.S. Appl. No. 10/352,278 Filed Dec. 19, 2002; Polymer Electrolyte Membrane; (57929US002).

(Continued)

*Primary Examiner*—David W. Wu
*Assistant Examiner*—Henry Hu
(74) *Attorney, Agent, or Firm*—Philip Y. Dahl

(57) ABSTRACT

A method is provided for aqueous emulsion co-polymerization of two or more fluoromonomers comprising the steps of: 1) forming an aqueous pre-emulsion by mixing a fluoromonomer according to formula I:

$$F_2C=CF-R^1-SO_2X \qquad (I)$$

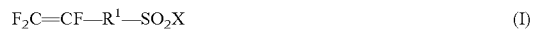

wherein $R^1$ is a branched or unbranched perfluoroalkyl, perfluoroalkoxy or perfluoroether group comprising 1–15 carbon atoms and 0–4 oxygen atoms and wherein X is F, Cl or Br, together with 0.001–0.9 molar equivalents of a base, in the absence of added emulsifier; and 2) reacting the pre-emulsion with one or more perfluorinated comonomers in the absence of added emulsifier so as to form a fluoropolymer latex comprising a fluoropolymer wherein more than 1 mol % of monomer units are derived from the fluoromonomer according to formula I. In another aspect, the present invention provides a fluoropolymer derived from the fluoropolymer latex made according to the method of the present invention which is free of added emulsifier. In another aspect, the present invention provides a polymer electrolyte membrane comprising the fluoropolymer made according to the method of the present invention which is free of added emulsifier.

42 Claims, No Drawings

U.S. PATENT DOCUMENTS

| | | |
|---|---|---|
| 6,380,337 B1 | 4/2002 | Abe et al. |
| RE37,701 E | 5/2002 | Bahar et al. |
| 6,387,964 B1 | 5/2002 | D'Agostino et al. |
| 6,423,784 B1 | 7/2002 | Hamrock et al. |
| 6,426,397 B1 | 7/2002 | Armand et al. |
| 6,462,228 B1 | 10/2002 | Dams |
| 6,498,216 B1* | 12/2002 | Cheng .................. 525/199 |
| 6,503,378 B1 | 1/2003 | Fisher |
| 6,552,135 B1 | 4/2003 | Schnurnberger et al. |
| 6,624,328 B1 | 9/2003 | Guerra |
| 6,649,703 B1 | 11/2003 | Michot et al. |
| 6,667,377 B1* | 12/2003 | Feiring et al. ........... 526/240 |
| 6,670,424 B1 | 12/2003 | Michot et al. |
| 6,872,781 B1 | 3/2005 | Hedhli et al. |
| 2002/0014405 A1 | 2/2002 | Arcella et al. |
| 2002/0040106 A1 | 4/2002 | Wlassics et al. |
| 2003/0032739 A1 | 2/2003 | Kerres et al. |
| 2003/0092940 A1 | 5/2003 | Hamrock |
| 2003/0181572 A1 | 9/2003 | Tan et al. |
| 2003/0181615 A1 | 9/2003 | Ameduri et al. |
| 2003/0208014 A1 | 11/2003 | Kerres et al. |
| 2004/0241518 A1 | 12/2004 | Yang |
| 2005/0107488 A1* | 5/2005 | Yandrasits et al. ......... 522/156 |
| 2005/0107489 A1* | 5/2005 | Yandrasits et al. ......... 522/156 |
| 2005/0107490 A1* | 5/2005 | Yandrasits et al ......... 522/156 |
| 2005/0107532 A1* | 5/2005 | Guerra et al. ............ 525/178 |
| 2005/0113528 A1* | 5/2005 | Jing et al. ................ 525/326.2 |
| 2005/0131096 A1* | 6/2005 | Jing et al. ..................... 522/1 |
| 2005/0131097 A1* | 6/2005 | Jing et al. ..................... 522/1 |
| 2005/0137351 A1* | 6/2005 | Guerra ................ 525/326.2 |

FOREIGN PATENT DOCUMENTS

| | | |
|---|---|---|
| DE | 26 38 791 | 3/1977 |
| DE | 100 21 104 A1 | 11/2001 |
| EP | 0 048 964 A2 | 4/1982 |
| EP | 0 407 937 | 1/1991 |
| EP | 0 422 231 B1 | 12/1995 |
| EP | 1 085 038 A1 | 3/2001 |
| EP | 1 091 435 A1 | 4/2001 |
| EP | 1 179 548 A1 | 2/2002 |
| EP | 1 238 999 A1 | 9/2002 |
| EP | 1 359 142 A1 | 11/2003 |
| FR | 2 387 260 | 12/1976 |
| GB | 1184321 | 3/1970 |
| JP | 53-29291 | 3/1978 |
| JP | 53-97988 | 8/1978 |
| JP | 53-134088 | 11/1978 |
| JP | 54-52690 | 4/1979 |
| JP | 54-052690 | 4/1979 |
| JP | 56-72002 | 6/1981 |
| JP | SHO 60-250009 | 12/1985 |
| JP | SHO 62-288617 | 12/1987 |
| JP | 64-3140 | 1/1989 |
| JP | 5-314960 | 11/1993 |
| JP | 8-239494 | 9/1996 |
| JP | 2000-119420 | 4/2000 |
| JP | 2000-268834 | 9/2000 |
| JP | 2001-29800 | 2/2001 |
| JP | 2001-176524 | 6/2001 |
| JP | 2001-354641 | 12/2001 |
| JP | 2002-003466 | 1/2002 |
| JP | 2002-313364 | 10/2002 |
| WO | WO 94/03503 | 2/1994 |
| WO | WO 97/17381 | 5/1997 |
| WO | WO 99/38897 | 8/1999 |
| WO | WO 00/52060 | 9/2000 |
| WO | WO 01/27167 A1 | 4/2001 |
| WO | WO 01/87992 A2 | 11/2001 |
| WO | WO 01/96268 A2 | 12/2001 |
| WO | WO 02/50142 A1 | 6/2002 |
| WO | WO 02/062749 A1 | 8/2002 |
| WO | WO 02/087001 A2 | 10/2002 |
| WO | WO 02/103834 A1 | 12/2002 |
| WO | WO 03/004463 A1 | 1/2003 |
| WO | WO 03/022892 A2 | 3/2003 |

OTHER PUBLICATIONS

Kirk-Othmer, *Encyclopedia of Chemical Technology*, 3d ed., vol. 10, (1980), pp. 840-851.

Gab-Jin Hwang et al.; "Preparation Of Cation Exchange Membrane As A Separator For The All-Vanadium Redox Flow Battery", Journal of Membrane Science, Elsevier Scientific Publ. Company, Amsterdam, NL, vol. 120, No. 1, Oct. 30, 1996, pp. 55-67.

* cited by examiner

AQUEOUS EMULSION POLYMERIZATION OF FUNCTIONALIZED FLUOROMONOMERS

FIELD OF THE INVENTION

This invention relates to aqueous emulsion polymerization of certain functionalized fluoromonomers to form sulfonic acid functional polymers which are useful in the manufacture of polymer membranes in fuel cells or other such electrolytic cells. In particular, the present invention relates to a process for making a fluoropolymer that is a copolymer of a fluorinated olefin such as tetrafluoroethylene and functionalized fluoromonomers.

BACKGROUND OF THE INVENTION

Certain fluoropolymers bearing sulfonic acid functional groups are useful in the manufacture of polymer electrolyte membranes for electrolytic cells such as fuel cells. Examples include NAFION® (DuPont Chemical Company, Wilmington, Del.), which is a copolymer of tetrafluoroethylene (TFE) and a co-monomer according to the formula: $FSO_2$—$CF_2$—$CF_2$—O—$CF(CF_3)$—$CF_2$—O—CF=$CF_2$ that is sold in sulfonic acid form, i.e., with the $SO_2F$ end group hydrolyzed to $SO_3H$. It is known to make such fluoropolymers by aqueous emulsion polymerization in the presence of ammonium perfluorooctanoate (APFO) as an emulsifier.

U.S. Pat. No. 3,635,926 purportedly discloses tough, stable copolymers of tetrafluoroethylene monomer and fluorovinyl ether monomers which can be produced by aqueous polymerization of the monomers by a process that requires that the reaction be carried out in the presence of a water-soluble initiator, an emulsifying agent and a gaseous chain transfer agent.

International Patent Application Pub. No. WO94/03503 purportedly discloses fluoroorganic polymeric material which comprises a polymeric chain having pendent groups including ion-exchange groups for use as an ion-exchange membrane in an electrochemical device. The application purportedly discloses preparation of the fluoroorganic polymeric material by aqueous emulsion polymerization using a emulsifying agent that is preferably a perfluoroalkanoate. ('503 at page 13).

Japanese Kokai Pat. App. No. 62-288617 purportedly discloses a method of producing a perfluorocarbon polymer having a sulfonic acid type functional group. The process is characterized in that emulsion copolymerization is carried out after emulsification of the liquid monomer is performed in an aqueous medium in the presence of a fluorine-containing emulsifier. The reference teaches the use of perfluorocarboxylic acid type emulsifiers at page 6.

U.S. Pat. No. 5,608,022 purportedly discloses a method for producing a perfluorocarbon copolymer containing functional groups which includes the steps of pre-emulsifying a perfluorocarbon monomer containing a functional group, adding at least one water-soluble organic chain transfer agent, and polymerizing with tetrafluoroethylene (TFE). The reference teaches the use of dispersing agents, e.g., at col. 6, lines 10–30.

U.S. Pat. No. 5,804,650 purportedly discloses preparation of a vinylidene fluoride (VdF) copolymer by emulsion-polymerizing VdF monomer with a reactive emulsifying agent. The resulting polymer latices are used suitably, for example, for paints. The reference teaches that the reactive emulsifying agent is present in an amount of 0.001 to 0.1% by mole in the combination of monomers ('650, col. 8, lines 58–60, and col. 17, lines 54–56). The reference also teaches that the reactive emulsifying agent is present in an amount of 0.0001 to 10% by weight relative to the weight of water in the emulsion ('650, col. 4, line 52, and col. 13, lines 10–17) and teaches against the addition of reactive emulsifying agent in any amount greater than 10% by weight relative to the weight of water in the emulsion. ('650, col. 22, lines 12–15) In Comparative Example 6, a tetrafluoroethylene (TFE) copolymerization is disclosed.

SUMMARY OF THE INVENTION

Briefly, the present invention provides a method of aqueous emulsion polymerization of two or more fluoromonomers comprising the steps of: 1) forming an aqueous pre-emulsion by mixing a fluoromonomer according to formula I:

$$F_2C=CF-R^1-SO_2X \quad (I)$$

wherein $R^1$ is a branched or unbranched perfluoroalkyl, perfluoroalkoxy or perfluoroether group comprising 1–15 carbon atoms and 0–4 oxygen atoms and wherein X is F, Cl or Br, together with 0.001–0.9 molar equivalents of a base, in the absence of added emulsifier; and 2) reacting the pre-emulsion with one or more perfluorinated comonomers in the absence of added emulsifier so as to form a fluoropolymer latex comprising a fluoropolymer wherein more than 1 mol % of monomer units are derived from the fluoromonomer according to formula I. Typically the base is a hydroxide. Typically the fluoropolymer latex comprising a fluoropolymer wherein more than 5 mol % of monomer units are derived from the fluoromonomer according to formula I, and more typically more than 10 mol %.

In another aspect, the present invention provides a fluoropolymer latex made according to the method of the present invention which is free of added emulsifier.

In another aspect, the present invention provides a fluoropolymer derived from the fluoropolymer latex made according to the method of the present invention which is free of added emulsifier.

In another aspect, the present invention provides a polymer electrolyte membrane comprising the fluoropolymer made according to the method of the present invention which is free of added emulsifier.

What has not been described in the art, and is provided by the present invention, is a method of aqueous emulsion polymerization of two or more perfluorinated monomers in the absence of added emulsifier to form a fluoropolymer useful as a polymer electrolyte.

In this application:

"added emulsifier" means an effective amount of a fluorine-containing non-telogenic emulsifier other than that formed by the reaction of a base with a fluoromonomer according to the formula: $F_2C=CF-R-SO_2X$, wherein R is a branched or unbranched perfluoroalkyl, perfluoroalkoxy or perfluoroether group comprising 1–15 carbon atoms and 0–4 oxygen atoms and wherein X is F, Cl or Br, and typically means an effective amount of any emulsifier other than that formed by the reaction of a base with a fluoromonomer according to the formula: $F_2C=CF-R-SO_2X$; and "effective amount" means, with regard to an emulsifier, an amount sufficient to provide adequate emulsification for aqueous emulsion polymerization in the absence of an emulsifier formed by the reaction of a base with a fluoromonomer according to the formula: $F_2C=CF-R-SO_2X$, wherein R is a branched or unbranched perfluoroalkyl, perfluoroalkoxy or perfluoroether group comprising 1–15 carbon atoms and 0–4 oxygen atoms and wherein X is F, Cl or Br, and more typically may mean any substantial amount.

It is an advantage of the present invention to provide a fluoropolymer ionomers free of added emulsifier for use in fuel cells or other electrolytic cells.

DETAILED DESCRIPTION

The present invention provides a method of emulsion polymerization of two or more fluoromonomers comprising the steps of: 1) forming an aqueous pre-emulsion by mixing, a fluoromonomer according to formula I:

$$F_2C=CF-R^1-SO_2X \quad (I)$$

wherein $R^1$ is a branched or unbranched perfluoroalkyl, perfluoroalkoxy or perfluoroether group comprising 1–15 carbon atoms and 0–4 oxygen atoms and wherein X is F, Cl or Br, together with 0.001–0.9 molar equivalents of a base, in the absence of added emulsifier; and 2) reacting the pre-emulsion with one or more perfluorinated comonomers in the absence of added emulsifier so as to form a fluoropolymer latex comprising a fluoropolymer wherein more than 1 mol-% of monomer units are derived from the fluoromonomer according to formula I.

In the fluoromonomer according to formula I, X is F, Cl or Br. X is typically F or Cl and most typically F.

In the fluoromonomer according to formula I, $R^1$ is a branched or unbranched perfluoroalkyl, perfluoroalkoxy or perfluoroether group comprising 1–15 carbon atoms and 0–4 oxygen atoms. $R^1$ is typically $-O-R^2-$ wherein $R^2$ is a branched or unbranched perfluoroalkyl or perfluoroether group comprising 1–15 carbon atoms and 0–4 oxygen atoms. $R^1$ is more typically $-O-R^3-$ wherein $R^3$ is a perfluoroalkyl group comprising 1–15 carbon atoms. Examples of $R^1$ include:

$-(CF_2)_n-$ where n is 1, 2, 3, 4, 5, 6, 7, 8, 9, 10, 11, 12, 13, 14 or 15

$(-CF_2CF(CF_3)-)_n$ where n is 1, 2, 3, 4, or 5

$(-CF(CF_3)CF_2-)_n$ where n is 1, 2, 3, 4, or 5 $(-CF_2CF(CF_3)-)_n-CF_2-$ where n is 1, 2, 3 or 4

$(-O-CF_2CF_2-)_n$ where n is 1, 2, 3, 4, 5, 6 or 7

$(-O-CF_2CF_2CF_2-)_n$ where n is 1, 2, 3, 4, or 5

$(-O-CF_2CF_2CF_2CF_2-)_n$ where n is 1, 2 or 3

$(-O-CF_2CF(CF_3)-)_n$ where n is 1, 2, 3, 4, or 5

$(-O-CF_2CF(CF_2CF_3)-)_n$ where n is 1, 2 or 3

$(-O-CF(CF_3)CF_2-)_n$ where n is 1, 2, 3, 4 or 5

$(-O-CF(CF_2CF_3)CF_2-)_n$ where n is 1, 2 or 3

$(-O-CF_2CF(CF_3)-)_n-O-CF_2CF_2-$ where n is 1, 2, 3 or 4

$(-O-CF_2CF(CF_2CF_3)-)_n-O-CF_2CF_2-$ where n is 1, 2 or 3

$(-O-CF(CF_3)CF_2-)_n-O-CF_2CF_2-$ where n is 1, 2, 3 or 4

$(-O-CF(CF_2CF_3)CF_2-)_n-O-CF_2CF_2-$ where n is 1, 2 or 3

$-O-(CF_2)_n-$ where n is 1, 2, 3, 4, 5, 6, 7, 8, 9, 10, 11, 12, 13 or 14

$R^1$ is typically $-O-CF_2CF_2CF_2CF_2-$ or $-O-CF_2-CF(CF_3)-O-CF_2-CF_2-$ and most typically $-O-CF_2CF_2CF_2CF_2-$.

The fluoromonomer according to formula I may be synthesized by any suitable means, including methods disclosed in U.S. patent application Ser. No. 10/322,226, filed Dec. 17, 2002.

For the preparation of a stable pre-emulsion of I in water, the $SO_2F$-comonomer is thoroughly mixed together with water and a base. The weight ratio of water to the $SO_2F$-comonomer is in the range of 0.1:1 to 1:0.01 and typically between 0.2:1 and 1:0.1. Any suitable base may be used, including alkaline hydroxides such as NaOH, KOH, and LiOH, earth alkaline hydroxides, hydroxides of Group III metals, or $NH_4OH$. Additional inorganic basic salts like carbonates may be used. Quaternary alkyl ammonium hydroxides may be used but their utility may be limited due to their chain transfer activities, especially the larger chain alkyl compounds ($R_4N^+OH^-$). Typically, hydroxides of Group I metals or $NH_4OH$ are used, most typically LiOH or $NH_4OH$. The base is added to the pre-emulsion in an amount equal to 0.001–0.9 molar equivalents relative to the fluoromonomer according to formula I, typically 0.01–0.5 molar equivalents and more typically 0.02–0.3 molar equivalents. The pre-emulsion should be stable and should result in the formation of a polymer with desirable properties such as melt processablity, and the like.

Any suitable method may be used to mix the aqueous pre-emulsion, including the use of a homogenizer (e.g. Microfluidizer™ from Microfluids), high speed agitators, colloid mill mixers, or ultrasonic devices. Mixing times are typically from 1–60 min, more typically 1–20 min. Pre-emulsification of the liquid fluorinated $SO_2F$-containing comonomer typically results in a pre-emulsion having an average droplet size of less than 20 μm, more typically less than 10 μm. Use of a high speed agitator may result in a pre-emulsion having an average droplet size of 0.5–10 μm. Other devices such as microfluidizers may deliver pre-emulsions having a particle size of less than 1 μm.

Typically the aqueous pre-emulsion has a pot life (settling time) of at least 1 hour, and more typically at least 3 hours. Pot life is defined as the time required for 10 weight % of the monomer droplets to settle or separate out of the emulsion. The pot life of the aqueous emulsion of the liquid comonomer can be increased by increasing the pH, a typical range being about 5–7.

The pre-emulsification of the liquid comonomer may be carried out in a separate kettle from the polymerization kettle, in the polymerization reactor itself prior to commencing the polymerization, or in the monomer supply line to the polymerization kettle. The weight ratio of the liquid emulsified $SO_2F$-monomer to water during polymerization is typically between 1:1 and 1:100, more typically between 1:2 and 1:50 and most typically between 1:2 and 1:20.

The aqueous emulsion polymerization can be performed continuously in which, for example, the aqueous emulsion of the liquid comonomer and other monomers, water, buffers and catalysts are fed continuously to a stirred reactor under optimum pressure and temperature conditions while the resulting emulsion is removed continuously. An alternative technique is batch or semi batch polymerization by feeding the ingredients into a stirred reactor and allowing them to react at a set temperature for a specified length of time or by charging ingredients into the reactor and feeding the monomers and emulsified liquid fluorinated monomer into the reactor to maintain a constant pressure until a desired amount of polymer is formed. The polymerization can be carried out in a standard or conventional kettle used for emulsion polymerization of gaseous fluorinated monomers.

In one embodiment, when gaseous comonomers are used, a portion of the pre-emulsion is pre-charged into the reaction vessel and, after initiation, the gaseous monomer(s) and the remaining pre-emulsion are fed continuously. In another embodiment where gaseous comonomers are used, the whole amount of the pre-emulsified $SO_2F$-comonomers can be placed into the kettle and only the gaseous monomers fed continuously.

Any initiator or initiator system suitable for free-radical polymerization may be used, including example ammonium persulfate (APS) or a redox system such as APS/disulfite and potassium permanganate. When oil-soluble initiators having no solubility or only insufficient solubility in water are used, they are typically mixed with the aqueous emulsion of the liquid fluorinated monomer. Examples of oil-soluble initiators include substituted dibenzoyl peroxides and cumene hydroperoxides, including bisperfluoropropionyl peroxide. Typically the concentration of initiator is between 0.01 wt % to 3 wt %, more typically between 0.05 wt % and 2 wt %.

The polymerization systems may optionally comprise auxiliaries such as buffers, complex-formers or chain-transfer agents. The polymerization can be carried out at any suitable pH. pH is typically not critical but depends on the initiator system used. To avoid on going conversion of the $SO_2F$-unit into the salt-form during polymerization, the pH is typically pH$\leq$7, more typically pH$\leq$6.

Any suitable conditions of temperature and pressure may be used. The polymerization temperature is typically between 10 and 100° C. The polymerization pressure is typically between 3 and 30 bar. Typically the reaction kettle is oxygen-free.

Typically, the solids content of the resulting polymer latex is between 10 and 50% without major coagulation.

Any suitable perfluorinated comonomers may be used. Typically the comonomer is ethylenically unsaturated. Typically the comonomer bears no additional functional groups. Typically comonomers are selected from species according to formula II:

$$F_2C=CF-R^4 \qquad (II)$$

where $R^4$ is F or a branched or unbranched perfluoroalkyl, perfluoroalkoxy or perfluoroether group comprising 1–5 carbon atoms and 0–2 oxygen atoms. More typically, the comonomers are selected from tetrafluoroethylene (TFE), hexafluoropropylene (HFP) and perfluoro(methyl vinyl ether) (PMVE). Most typically, the comonomer is tetrafluoroethylene (TFE).

Additional copolymers may include non-perfluorinated or H-containing $C_2$–$C_4$ fluoro olefins such as vinylidene fluoride (VDF), trifluoro ethylene, ethylene and propylene. The amount of these comonomers in the final copolymer is typically less than 40 mol %, more typically less than 20 mol %.

In addition to the above-mentioned gaseous monomers, further liquid fluorinated comonomers may be added to the polymerization. The additional liquid fluorinated comonomers can be pre-emulsified together with the $SO_2F$-containing monomer in the presence of a base or they can be pre-emulsified separately.

In one embodiment, the liquid fluorinated monomer for use is a fluorinated vinyl ether, typically a perfluoro vinyl ether. The fluorinated vinyl ether may be a perfluorinated vinyl ether corresponding to formula (III):

$$CF_2=CFO(R_fO)_n(R'_fO)_mR''_f \qquad (III)$$

wherein $R_f$ and $R'_f$ are different linear or branched perfluoroalkylene groups of 2–6 carbon atoms, m and n are independently 0–10 and the sum of n and m is at least 1, and $R''_f$ is a perfluoroalkyl group of 1–6 carbon atoms.

Examples of fluoro vinyl ethers of formula (III) include compounds of the formula (IV):

$$CF_2=CFO(CF_2CF_2CFZO)_nR''_f \qquad (IV)$$

where $R''_f$ is a perfluoroalkyl group having 1–6 carbon atoms, n=1–5, and Z=F or $CF_3$. Examples of compounds of formula (IV) include those in which $R''_f$ is $C_3F_7$, n=1, Z=F or $CF_3$ and $CF_3$—O—$CF(CF_3)$—$CF_2$—$CF_2$—O—CF=$CF_2$ (boiling point 85° C.). Further useful fluorinated vinyl ethers included in formula (III) correspond to the formula (V):

$$CF_2=CF-O-(CF_2CFXO)_m-R_f \qquad (V)$$

in which m represents an integer of 1 to 5, X is F or $CF_3$ and $R_f$ is a $C_1$–$C_5$ perfluoroalkyl group. Examples of monomers of formula V include those where X is $CF_3$ and $R_f$ is perfluoro n-propyl and wherein m is 1 (boiling point of 103° C.) or m is 2 (boiling point of 160° C.).

Additional perfluoro vinyl ether monomers useful in the invention include compounds of the formula $$CF_2=CFO[(CF_2CFCF_3O)_n(CF_2CF_2CF_2O)_m(CF_2)_p]$$
$$C_xF_{2x+1} \qquad (VI)$$

where m and n=1–10, p=0–3, and x=1–5. Preferred members of this class include compounds where n=1, m=1, p=0, and x=1.

Still further examples of perfluoro vinyl ethers include ethers corresponding to formula (VII):

$$CF_2=CFOCF_2CF(CF_3)-O-(CF_2O)_mC_nF_{2n+1} \qquad (VII)$$

where n=1, m=0–3 and where, preferably m=0. The amount of these liquid comonomers in the final copolymer is typically less than 40 mol %, more typically less than 20 mol %, and most typically less than 15 mol %.

Additional liquid fluorinated comonomers which may be added to the polymerization include those having the structural formula:

$$CF_2=CF-[O-CF_2-CF(CF_3)]_n-O-(CF_2)_m-$$
$$COOCH_3 \qquad (VIII)$$

where n=0–3 and m=0–6.

The liquid ester can be pre-emulsified together with the $SO_2F$-comonomer. Typically the amount of (VIII) is in the range of 0–10 mol %, and more typically 0–5 mol %.

The monomers are present in the reaction mixture in a ratio such that the resulting fluoropolymer comprises more than 1% of monomer units derived from the fluoromonomer according to formula I, typically more than 5%, more typically more than 10%, and more typically more than 13%.

The resulting polymers are amorphous or semi-crystalline materials, typically semi-crystalline with a melting point lower than 300° C.

To adjust the molecular weight of the resulting polymers any suitable chain-transfer agents can be used, typically gaseous hydrocarbon chain-transfer agents.

Typically, the polymerization produces a fluoropolymer latex comprising the fluoropolymer according to the present invention. The fluoropolymer latex and the fluoropolymer are free of added emulsifier.

The fluoropolymer according to the present invention may be formed into a polymer electrolyte membrane by any suitable method, including casting, molding, extrusion, and the like. Typically, the polymer is hydrolyzed to convert $SO_2F$ groups to $SO_3^-$ groups before forming, typically by contact with water, and typically with addition of a base such as LiOH. Typically, the membrane is cast from a latex or suspension of the fluoropolymer and then dried, annealed, or both. Typically, the latex or suspension is aqueous and may additionally contain alcohols such as propanol or other co-solvents. Typically, the membrane has a thickness of less than 90 microns, more typically less than 60 microns, and more typically less than 30 microns.

In general, copolymers which contain predominantly $SO_2F$ groups rather than $SO_3^-$ groups are more easily melt processed, e.g. by extrusion or hot pressing into various shapes, e.g. into films or membranes. These articles may be further hydrolyzed to generate ion exchange membranes. For copolymers with increasing $SO_3^-$ groups content, solutions processing, e.g. casting films or membranes, may be more appropriate.

This invention is useful in the manufacture of polymer electrolyte membranes for use in fuel cells or other electrolytic cells.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all reagents were obtained or are available from Aldrich Chemical Co., Milwaukee, Wis., or may be synthesized by known methods.

Test Methods

Melt flow index (MFI) was measured according to ISO 12086, using a standardized extrusion die of 2.1 mm diameter and 8 mm length at 265° C./5 kg load.

Particle size was measured by dynamic light scattering using a Malvern Zetasizer 1000 HAS according to ISO/DIS 13321. Prior to the measurements the latex was diluted with 0,001 mol/L KCl. The temperature of measurements was 20° C. The Z-average values are reported.

The incorporation of the $SO_2F$-comonomers was measured by FTIR (using a Nicolet Omnic 5.1). The measurements were done using transmission technique on hot-pressed films (100–200 µm thickness). The MV4S-content R in mol % was determined by measuring the peak height at 1004 $cm^{-1}$ divided by the peak height at 2365 $cm^{-1}$ multiplied by $$0.0632 \left( R = \frac{\text{peak height 1004 } cm^{-1}}{\text{peak height 2365 } cm^{-1}} \cdot 0,0632 \right).$$

The method was calibrated by solid state $^{19}F$-NMR using a Varian™ INOVA 400 WB with 3.2 mm MAS probe.

Example 1

390 g (1.03 mole) $CF_2$=CF—O—$(CF_2)_4$—$SO_2F$ (MV4S, M.W. 378.11) was preemulsified into 270 g water with the addition of 13.5 g (0.322 mole) $LiOH.H_2O$ (M.W. 41.97) under high shear (24,000 rpm), using an ULTRA-TURRAX® Model T 25 disperser S25 KV-25F (IKA-Werke GmbH & Co. KG, Staufen, Germany) for 2 min. The milky white dispersion had an average particle size of 1.5 µm and a shelf life of >3 hours. A 53 liter polymerization kettle equipped with an impeller agitator system was charged with 23 kg deionized water. The kettle was heated up to 60° C. and then the preemulsion was charged into the oxygen-free polymerization kettle. At 60° C. the kettle was further charged with 630 g gaseous tetrafluoroethylene (TFE) to 6 bar absolute reaction pressure. At 60° C. and 240 rpm agitator speed the polymerization was initiated by addition of 15 g sodium disulfite and 40 g ammonium peroxodisulfate. During the course of the reaction, the reaction temperature was maintained at 60° C. Reaction pressure was maintained at 6.0 bar absolute by feeding additional TFE into the gas phase. A second portion of MV4S-preemulsion was prepared in the same manner and proportions described above, using 4,600 g (12.17 mole) MV4S, 160 g (3.81 mole) $LiOH.H_2O$ and 3,200 g water. The second preemulsion portion was fed into the liquid phase during the course of the reaction continuously.

After feeding 6150 g TFE in 252 minutes polymerization time, the monomer valve was closed and the monomer feed interrupted. The continuing polymerization reduced the pressure of the monomer gas phase to 2 bar within 40 minutes. At that time, the reactor was vented and flushed with nitrogen gas.

The 38.4 kg polymer dispersion thus obtained had a solids content of 29.2% and a pH value of 3. The average particle size of the latex was 139 nm, as measured using dynamic light scattering. The freeze coagulated polymer was pressed into 100–200 µm thick films at 300° C. FTIR-measurements on the films showed an incorporation of 14,1 mol % of MV4S. MFI (265° C., 5 kg)=0.3 g/10 min.

Example 2

152 g (0.402 mole) $CF_2$=CF—O—$(CF_2)_4$—$SO_2F$ (MV4S, M.W. 378.11) was preemulsified into 170 g water with the addition of 4 g (0.095 mole) $LiOH.H_2O$ (M.W. 41.97) under high shear (24,000 rpm), using an ULTRA-TURRAX® Model T 25 disperser (IKA-Werke GmbH & Co. KG, Staufen, Germany) for 5 min. A 7 liter polymerization kettle equipped with an impeller agitator system (320 rpm) was charged with 3 kg deionized water. The kettle was heated up to 60° C. and then the pre-emulsion was charged into the oxygen-free kettle and was further charged with 170 g gaseous tetrafluoroethylene (TFE) to 8 bar absolute reaction pressure. Polymerization was initiated by addition of 1.5 g sodium disulfite and 4 g ammonium peroxodisulfate. During the course of the reaction, the reaction temperature was maintained at 60° C. Reaction pressure was maintained at 8.0 bar absolute by feeding additional TFE into the gas phase. A second MV4S-preemulsion portion was prepared in the same manner described above, using 430 g (1.14 mole) MV4S, 8 g (0.191 mole) $LiOH.H_2O$ and 830 g water and fed continuously.

After feeding 800 g TFE in 331 minutes polymerization time, the monomer valve was closed and the monomer feed interrupted. The continuing reaction reduced the pressure of the monomer gas phase to 3 bar. At that time, the reactor was vented and flushed with nitrogen gas.

The 4.3 kg polymer dispersion thus obtained had a solids content of 33.9% and a pH value of 3. The dispersion consisted of latex particles having an diameter of 99 nm. The polymer was freeze coagulated, and washed with demineralised water in four cycles and was dried for 15 hours at 130° C. IR-spectroscopy showed a composition of 88.4 mol % TFE and 11.6 mol % MV4S. The peak height ratio of the $SO_3^-$ absorbance at 1063 $cm^{-1}$ divided by the $SO_2F$ absorbance at 1467 $cm^{-1}$ was 0.012; indicating that only minimal amounts of $SO_3^-$-groups were present in the polymer.

Comparative Example 3C 900 g (2.38 mole) $CF_2$=CF—O—$(CF_2)_4$—$SO_2F$ (MV4S, M.W. 378.11) was preemulsified into 560 g water with the addition of 16 g of a 30% perfluorooctanoate ammonium salt solution (3M™ FLUORAD™ FX1006, 3M Company, St. Paul, Minn.) under high shear (24,000 rpm), using an ULTRA-TURRAX® Model T 25 disperser (IKA-Werke GmbH & Co. KG, Staufen, Germany) for 5 min. A 53 liter polymerization kettle equipped with an impeller agitator system was charged with 37 g ammonium oxalate-1-hydrate and 7 g oxalic acid-2-hydrate in 22.9 kg deionized water and 269 g 30% perfluorooctanoate ammonium salt solution (3M™ FLUORAD™ FX1006, 3M Company, St. Paul, Minn.). The oxygen-free kettle was then heated to 50° C. and the agitation system was set to 240 rpm. After the kettle was purged with tetrafluoroethylene (TFE), the preemulsion was then charged into the reaction kettle. The kettle was further charged with 705 g gaseous tetrafluoroethylene (TFE) to 6 bar absolute reaction pressure. Polymerization was initiated by addition of 140 g of a 1% solution of potassium permanganate (KMnO$_4$). During the course of the reaction, the reaction temperature was maintained at 50° C. Reaction pressure was maintained at 6.0 bar absolute by feeding additional TFE into the gas phase. A second MV4S-preemulsion was prepared in the same manner described above, using 4,170 g (11.02) MV4S, 73 g 30% perfluorooctanoate ammonium salt solution (3M™ FLUORAD™ FX1006, 3M Company, St. Paul, Minn.) and 2,500 g water. The second preemulsion was fed into the liquid phase during the course of the reaction.

After feeding 5575 g TFE in 330 minutes polymerization time, the monomer valve was closed and the monomer feed interrupted. The continuing reaction reduced the pressure of the monomer gas phase to 3.4 bar within 40 minutes. At that time, the reactor was vented and flushed with nitrogen gas.

The 37.1 kg polymer dispersion thus obtained had a solids content of 27.5% and a pH value of 3. The dispersion consisted of latex particles having an diameter of 70 nm. The polymer was freeze coagulated, washed with demineralised water in four cycles and was dried for 15 hours at 130° C. Solid state $^{19}$F-NMR-spectroscopy demonstrated a polymer comprising 85.3 mol % TFE and 14.7 mol % MV4S. The peak height ratio of the SO$_3^-$ absorbance to the SO$_2$F absorbance was 0.007. MFI (365° C., 2.16 kg)=0.2 g/10 min.

Various modifications and alterations of this invention will become apparent to those skilled in the art without departing from the scope and principles of this invention, and it should be understood that this invention is not to be unduly limited to the illustrative embodiments set forth hereinabove.

We claim:

1. A method of aqueous emulsion polymerization of two or more fluoromonomers comprising the steps of:
   1) forming a pre-emulsion by mixing, a fluoromonomer according to formula I:

$$F_2C=CF-R^1-SO_2X \quad (I)$$

wherein R$^1$ is a branched or unbranched perfluoroalkyl, perfluoroalkoxy or perfluoroether group comprising 1–15 carbon atoms and 0–4 oxygen atoms and wherein X is F, Cl or Br, together with 0.001–0.9 molar equivalents of a base, in the absence of added emulsifier; and
   2) reacting said pre-emulsion with one or more comonomers in the absence of added emulsifier, said comonomers being perfluorinated, so as to form a fluoropolymer latex comprising a fluoropolymer wherein more than 1 mol % of monomer units are derived from the fluoromonomer according to formula I.

2. The method according to claim 1 wherein said fluoropolymer dispersion comprises a fluoropolymer wherein more than 5 mol % of monomer units are derived from the fluoromonomer according to formula I.

3. The method according to claim 1 wherein said fluoropolymer latex comprises a fluoropolymer wherein more than 10 mol % of monomer units are derived from the fluoromonomer according to formula I.

4. The method according to claim 1 wherein said base is a hydroxide.

5. The method according to claim 1 wherein R$^1$ is —O—R$^2$— wherein R$^2$ is a branched or unbranched perfluoroalkyl or perfluoroether group comprising 1–15 carbon atoms and 0–4 oxygen atoms, and wherein X is F.

6. The method according to claim 1 wherein R$^1$ is —O—R$^3$— wherein R$^3$ is a perfluoroalkyl group comprising 1–15 carbon atoms, and wherein X is F.

7. The method according to claim 1 wherein R$^1$ is —O—CF$_2$CF$_2$CF$_2$CF$_2$— and X is F.

8. The method according to claim 2 wherein R$^1$ is —O—CF$_2$CF$_2$CF$_2$CF$_2$— and X is F.

9. The method according to claim 3 wherein R$^1$ is —O—CF$_2$CF$_2$CF$_2$CF$_2$— and X is F.

10. The method according to claim 1 wherein R$^1$ is —O—CF$_2$—CF(CF$_3$)—O—CF$_2$—CF$_2$— and X is F.

11. The method according to claim 2 wherein R$^1$ is —O—CF$_2$—CF(CF$_3$)—O—CF$_2$—CF$_2$— and X is F.

12. The method according to claim 3 wherein R$^1$ is —O—CF$_2$—CF(CF$_3$)—O—CF$_2$—CF$_2$— and X is F.

13. The method according to claim 1 wherein said preemulsion additionally comprises one or more fluorinated vinyl ether comonomer.

14. The method according to claim 13 wherein said fluorinated vinyl ether comonomer is a monomer according to formula (III):

$$CF_2=CFO(R_fO)_n(R'_fO)_mR''_f \quad (III)$$

where R$_f$ and R'$_f$ are independently selected from the group consisting of linear and branched perfluoroalkylene groups of 2–6 carbon atoms, where m is 0–10, where n is 0–10, where the sum of n and m is at least 1, and where R''$_f$ is a perfluoroalkyl group of 1–6 carbon atoms.

15. The method according to claim 1 wherein said comonomers include non-perfluorinated comonomers.

16. A fluoropolymer latex made according to the method of claim 1, said fluoropolymer latex being free of added emulsifier.

17. The fluoropolymer latex according to claim 16 comprising a fluoropolymer wherein more than 5 mol % of monomer units are derived from the fluoromonomer according to formula I.

18. The fluoropolymer latex according to claim 16 comprising a fluoropolymer wherein more than 10 mol % of monomer units are derived from the fluoromonomer according to formula I.

19. The fluoropolymer latex according to claim 16 wherein R$^1$ is —O—CF$_2$CF$_2$CF$_2$CF$_2$— and X is F.

20. The fluoropolymer latex according to claim 17 wherein R$^1$ is —O—CF$_2$CF$_2$CF$_2$CF$_2$— and X is F.

21. The fluoropolymer latex according to claim 18 wherein R$^1$ is —O—CF$_2$CF$_2$CF$_2$CF$_2$— and X is F.

22. The fluoropolymer latex according to claim 16 wherein R$^1$ is —O—CF$_2$—CF(CF$_3$)—O—CF$_2$—CF$_2$— and X is F.

23. The fluoropolymer latex according to claim 17 wherein R$^1$ is —O—CF$_2$—CF(CF$_3$)—O—CF$_2$—CF$_2$— and X is F.

24. The fluoropolymer latex according to claim 18 wherein $R^1$ is —O—$CF_2$—$CF(CF_3)$—O—$CF_2$—$CF_2$— and X is F.

25. A fluoropolymer derived from a fluoropolymer latex made according to the method of claim 1, said fluoropolymer being free of added emulsifier.

26. The fluoropolymer according to claim 25, wherein said fluoropolymer latex comprises a fluoropolymer wherein more than 5 mol % of monomer units are derived from the fluoromonomer according to formula I.

27. The fluoropolymer according to claim 25, wherein said fluoropolymer latex comprises a fluoropolymer wherein more than 10 mol % of monomer units are derived from the fluoromonomer according to formula I.

28. The fluoropolymer according to claim 25 wherein $R^1$ is —O—$CF_2CF_2CF_2CF_2$— and X is F.

29. The fluoropolymer according to claim 26 wherein $R^1$ is —O—$CF_2CF_2CF_2CF_2$— and X is F.

30. The fluoropolymer according to claim 27 wherein $R^1$ is —O—$CF_2CF_2CF_2CF_2$— and X is F.

31. The fluoropolymer according to claim 25 wherein $R^1$ is —O—$CF_2$—$CF(CF_3)$—O—$CF_2$—$CF_2$— and X is F.

32. The fluoropolymer according to claim 26 wherein $R^1$ is —O—$CF_2$—$CF(CF_3)$—O—$CF_2$—$CF_2$— and X is F.

33. The fluoropolymer according to claim 27 wherein $R^1$ is —O—$CF_2$—$CF(CF_3)$—O—$CF_2$—$CF_2$— and X is F.

34. A polymer electrolyte membrane comprising the fluoropolymer of claim 25 which has been hydrolyzed.

35. A polymer electrolyte membrane comprising the fluoropolymer of claim 26 which has been hydrolyzed.

36. A polymer electrolyte membrane comprising the fluoropolymer of claim 27 which has been hydrolyzed.

37. A polymer electrolyte membrane comprising the fluoropolymer of claim 28 which has been hydrolyzed.

38. A polymer electrolyte membrane comprising the fluoropolymer of claim 29 which has been hydrolyzed.

39. A polymer electrolyte membrane comprising the fluoropolymer of claim 30 which has been hydrolyzed.

40. A polymer electrolyte membrane comprising the fluoropolymer of claim 31 which has been hydrolyzed.

41. A polymer electrolyte membrane comprising the fluoropolymer of claim 32 which has been hydrolyzed.

42. A polymer electrolyte membrane comprising the fluoropolymer of claim 33 which has been hydrolyzed.

* * * * *

UNITED STATES PATENT AND TRADEMARK OFFICE
CERTIFICATE OF CORRECTION

PATENT NO. : 7,071,271 B2
APPLICATION NO. : 10/697768
DATED : July 4, 2006
INVENTOR(S) : Arne Thaler Page 1 of 2

It is certified that error appears in the above-identified patent and that said Letters Patent is hereby corrected as shown below:

On Title Page (item 56)
Column First Page Col. 1 (U.S. Patent Documents) — Line 3 - Delete "Grol" and insert -- Grot --, therefor.

On Title Page (item 56)
Column First Page Col. 2 (U.S. Patent Documents) — Line 20 - After "6,355,370" delete "B1" and insert -- B2 --, therefor.

On Title Page (item 56)
Column First Page Col. 2 (Other Publications) — Line 1 - Delete "10/352,278" and insert -- 10/325,278 --, therefor.

On Title Page (item 56)
Column Page 2 Col. 1 (U.S. Patent Documents) — Line 1 - After "6,380,337" delete "B1" and insert -- B2 --, therefor.

On Title Page (item 56)
Column Page 2 Col. 1 (U.S. Patent Documents) — Line 9 - After "6,552,135" delete "B1" and insert -- B2 --, therefor.

On Title Page (item 56)
Column Page 2 Col. 1 (U.S Patent Documents) — Line 11 - After "6,649,703" delete "B1" and insert -- B2 --, therefor.

On Title Page (item 56)
Column Page 2 Col. 1 (U.S. Patent Documents) — Line 12 - After "6,667,377" delete "B1" and insert -- B2 --, therefor.

On Title Page (item 56)
Column Page 2 Col. 1 (U.S. Patent Documents) — Line 14 - After "6,872,781 " delete "B1" and insert -- B2 --, therefor.

On Title Page (item 56)
Column Page 2 Col. 1 (U.S Patent Documents) — Line 25 - Delete "Yandrasits et al" and insert -- Yandrasits et al. --, therefor.

UNITED STATES PATENT AND TRADEMARK OFFICE
CERTIFICATE OF CORRECTION

PATENT NO. : 7,071,271 B2
APPLICATION NO. : 10/697768
DATED : July 4, 2006
INVENTOR(S) : Arne Thaler It is certified that error appears in the above-identified patent and that said Letters Patent is hereby corrected as shown below:

Column 2 — Line 7 - After "emulsion" delete ".".

Column 1 — Line 43 - After "perfluoroalkanoate" delete ".".

Column 2 — Line 8 - After "12 — 15)" insert -- . --.

Column 6 — Line 15 - After "formula" insert -- (VI): --.

Column 6 — Line 32 - After "formula" delete ":" and insert -- (VIII): --, therefor.

Column 7 — Line 55 - Delete "$LiOH.H_2O$" and insert -- $LiOH·H_2O$ --, therefor.

Column 8 — Line 8 - Delete "$LiOH.H_2O$" and insert -- $LiOH·H_2O$ --, therefor.

Column 8 — Line 29 - Delete "$LiOH.H_2O$" and insert -- $LiOH·H_2O$ --, therefor.

Column 8 — Line 45 - Delete "$LiOH.H_2O$" and insert -- $LiOH·H_2O$ --, therefor.

Signed and Sealed this

Twenty-eighth Day of November, 2006

JON W. DUDAS
*Director of the United States Patent and Trademark Office*